March 19, 1963 J. CAMPO AGUD 3,081,560
DIDACTICAL APPARATUS FOR TEACHING LANGUAGES
Filed Nov. 17, 1960

INVENTOR.
JOACHIM CAMPO AGUD

United States Patent Office

3,081,560
Patented Mar. 19, 1963

3,081,560
DIDACTICAL APPARATUS FOR TEACHING
LANGUAGES
Joaquin Campo Agud, Zaragoza, Spain
Filed Nov. 17, 1960, Ser. No. 70,080
Claims priority, application Spain Nov. 21, 1959
4 Claims. (Cl. 35—35)

The present invention relates to a new and improved didactical method and apparatus for teaching languages.

The apparatus according to the invention is essentially adapted to make possible the teaching of grammatical sentences in any two compared languages by joining together several small chips or cards on which words such as proper and common nouns, adjectives, verbs and the remaining parts of the speech are written. The shape of these cards is preferably rectangular, of greater width than depth, and they can be placed together, choosing previously the cards needed to make a sentence. That is to say, one may pick out the cards which have printed the needed words to make the wished for sentence in accordance with the correct grammatical order. For instance, to make the sentence "EL HOMBRE ES BUENO," it is necessary to pick out the cards which have these words printed on, one by one, or together.

As a part of the invention, each card is printed with some words in two languages, for example, in Spanish and English, in such a way that the student has the words in his own language and the translation in the foreign one. For instance on one card may be printed the definite article and noun, "EL HOMBRE" and in the same card and below, may be printed the English corresponding translation of "THE MAN." The verb "ES" will be displayed on a card above its corresponding word "IS." And, the adjective "BUENO" will also be printed above its corresponding English word "GOOD."

When the student wants to make the sentence mentioned above, he will pick out among all printed cards those that have the proper words placing them together till he has completed the sentence in both English and Spanish languages.

Naturally, the selection of these cards makes a lot easier the study of any language because, subconsciously, the student concentrates his attention on the language he is studying assimilating it very easily. The combination of cards, when exhibited to students with the words of the second language covered from view, works like a puzzle and the students find the pastime of supplying the correct words of the second language in proper sequence of great psychological value for didactical purposes.

In order to facilitate use of the cards in learning and reviewing the vocabulary of a second language being studied, the cards are placed on boards or frames, the surface of which are flat and vertical. These frames are provided with several, parallel, projecting elements placed transversely of the boards which define various horizontal channels to receive the cards. The height of these channels is the same as that of the cards. The projecting elements may be T-shape in section to hold the cards in the channels on the board or frame.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 2:
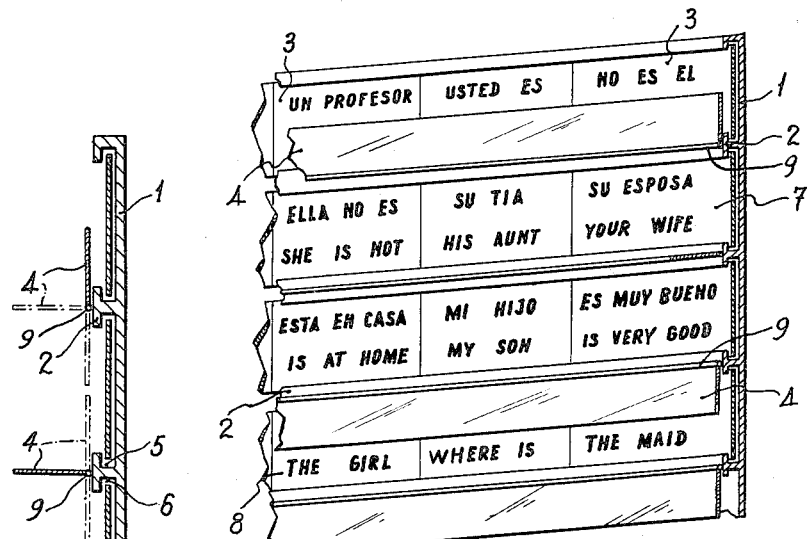
FIG. 2 is a perspective view, partially in section, of said device.
Figure 1:
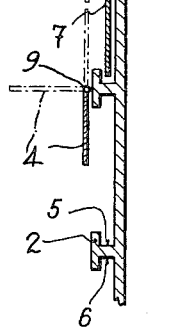
FIG. 1 is a vertical section of the upper portion of a framelike device for displaying language cards according to the invention.

Referring now more particularly to the drawings, in FIGS. 1 and 2 are illustrated as an example, the framelike display board 1 having projecting dividing elements 2 which are each preferably in the shape of an horizontal T and which define horizontal channels with floors 5 and ceilings 6.

The cards 7 are insertable into the channels and are held between the dividing elements.

Figure 3:
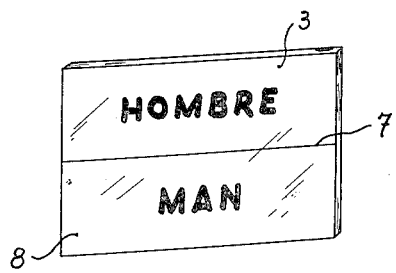
FIG. 3 is an enlarged perspective view of a language card suitable for display in said device.

FIGURE 3 illustrates a card on which the word "HOMBRE" has been written in the upper part 3. On the lower part of the card in the area 8 is displayed the correct translation, that is to say, "MAN." This division of areas is shown as an illustrative example of the division of the cards into upper and lower sectors.

By introducing several cards in the channel areas of the frame, determined by the dividing holders, one may achieve and display a wished for sentence or plurality of sentences in two languages for instance, English and Spanish.

When a sentence has been formed in the described manner upon the surface of the frame, it is obvious that it will be possible to read the sentence in both Spanish and English languages. But, as the student needs to practice the language he is learning, another possibility is offered by covering either one of the sectors or zones of the cards and letting him see just one language. Then the student has to translate from Spanish into English, or vice-versa, as he just sees the words in one language.

For this purpose, special covering-frames or members 4, are secured to the frontal sides of the dividing elements 2. The heights of these cover members are such as to cover half of the surface of cards 7. Covers 4 can be pivoted up and down each on an horizontal axis which coincides with the position of the dividers.

The covers 4 can thus be pivoted to three positions shown on FIGURE 1, i.e., to extend upwardly, horizontally, or downwardly. To retain the covers static in one of the three mentioned positions, a known system of retention can be secured to the axis.

In FIGURE 2 there is shown a view of the frame provided with the dividers 2 and the covering-frames 4.

The cards 7 have been chosen and lodged in those zones determined between every pair of dividers.

In the upper zone of the frame is illustrated the cover 4 pivoted upwardly to hide the zones 8 of the upper line of cards. Therefore, only the words in Spanish are visible, the words in English printed upon the lower zones 8 of the cards have been hidden so that a pupil will have to force his memory to attain the English translation of the Spanish words.

Between the second and third channels or lines from the top, the cover 4 has been positioned to extend in a perpendicular to the frame, thereby rendering visible all sectors of the cards in these two lines. In this position, the pupil can perfectly distinguish both zones 3 and 8 of every card.

In the fourth channel down from the top of the frame a cover 4 is illusrated turned downwardly on its axis and extending vertically to cover the upper zones 3 of the cards, leaving visible only the zones 8. In this position the pupil observes the "inverse" translation of the phrase inasmuch as he can read in English but not in Spanish, being obliged to remember and learn the meaning of each now hidden word, in Spanish.

By virtue of the apparatus described above, a method for teaching is available in which the pupil may learn easily any language, relying on the ability to hide voluntarily the translation of any phrase or sentence, selected previously by him or the teacher from the cards prepared for the purpose. The size and proportions of the frame as well as those of the cards may vary at will and can even be adapted for school conditions, in which case the teacher will have at his disposal a big frame, the cards of which will be easily visible for all assistants and pupils, while every pupil may in addition rely on a set of individual cards that correspond to the ones utilized by the teacher, and can follow his lessons in the most opportune manner.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A device for teaching languages comprising a frame, dividing means on said frame arranged to form a plurality of horizontally disposed channels, a series of rectangular cards each divided horizontally into at least two vertically spaced zones, one zone bearing at least one word in one language and another zone bearing the translation thereof in a second language, said cards being slidably receivable in said channels to display words, phrases and sentences, a horizontally disposed cover member provided between each adjacent pair of said channels, and said cover member being movable from a first position in which the two zones of each card in both channels of a pair are open to view to a second position wherein one zone of each card mounted in one of said pair of channels is covered and to a third position in which the other zone of each card in the second of said pair of channels is covered and hidden from view.

2. A device for teaching languages according to claim 1 wherein said cover member is mounted for swinging movement about a horizontally disposed axis.

3. A device for teaching languages according to claim 1 wherein said dividing means comprises elements projecting from the frame each having a horizontal T-shape in vertical section whereby adjacent elements define said channels and said cards are retained in the channels by their upper and lower edges engaging the arms of the T-shaped elements.

4. A device for teaching languages according to claim 3 wherein said cover member is revolvably mounted on one of said projecting elements and when in said first position in which the two zones of a card are open to view extends perpendicular to the surface of the frame.

References Cited in the file of this patent

UNITED STATES PATENTS

| | | |
|---|---|---|
| 1,790,287 | Stevens et al. | Jan. 27, 1931 |
| 2,234,075 | Carolin | Mar. 4, 1941 |
| 2,929,160 | Lyttle | Mar. 22, 1960 |

FOREIGN PATENTS

| | | |
|---|---|---|
| 824,031 | France | Nov. 3, 1937 |
| 848,277 | Germany | Sept. 1, 1952 |